(12) United States Patent
Prebil et al.

(10) Patent No.: US 8,691,137 B2
(45) Date of Patent: Apr. 8, 2014

(54) METHOD OF MOLDING PARTUS USING A TOOL SLEEVE FOR MOLD DIE

(75) Inventors: Charles R. Prebil, St. Louis, MO (US); James R. Fox, Florissant, MO (US); Alexander M. Rubin, St. Louis, MO (US); Randall D. Wilkerson, O'Fallon, MO (US)

(73) Assignee: The Boeing Company, Chicago, IL (US)

( * ) Notice: Subject to any disclaimer, the term of this patent is extended or adjusted under 35 U.S.C. 154(b) by 549 days.

(21) Appl. No.: 12/398,071

(22) Filed: Mar. 4, 2009

(65) Prior Publication Data

US 2010/0225016 A1 Sep. 9, 2010

(51) Int. Cl.
B29C 43/00 (2006.01)
B29C 53/02 (2006.01)
B29C 70/00 (2006.01)

(52) U.S. Cl.
USPC ........... 264/324; 264/257; 264/258; 264/285; 264/319

(58) Field of Classification Search
USPC .................................. 425/411, 195
See application file for complete search history.

(56) References Cited

U.S. PATENT DOCUMENTS

| | | | |
|---|---|---|---|
| 2,440,228 A | 4/1948 | Yardeny et al. | |
| 2,708,288 A * | 5/1955 | Fuller et al. | 264/122 |
| 4,061,817 A | 12/1977 | Maxel | |
| 4,151,031 A | 4/1979 | Goad et al. | |
| 4,414,266 A * | 11/1983 | Archer et al. | 156/242 |
| 4,414,269 A | 11/1983 | Lubowitz et al. | |
| 4,462,946 A | 7/1984 | Goldsworthy | |
| 4,571,355 A | 2/1986 | Elrod | |
| 4,608,220 A * | 8/1986 | Caldwell et al. | 264/510 |
| 4,674,712 A | 6/1987 | Whitener et al. | |
| 4,749,613 A | 6/1988 | Yamada et al. | |
| 4,759,815 A | 7/1988 | Frey | |
| 4,818,460 A | 4/1989 | Nied | |
| 4,913,910 A | 4/1990 | McCarville et al. | |
| 5,021,283 A | 6/1991 | Takenaka et al. | |
| 5,026,447 A | 6/1991 | O'Connor | |
| 5,026,514 A | 6/1991 | Hauwiller et al. | |
| 5,043,128 A | 8/1991 | Umeda | |
| 5,057,175 A | 10/1991 | Ashton | |
| 5,064,439 A * | 11/1991 | Chang et al. | 264/255 |
| 5,139,407 A * | 8/1992 | Kim et al. | 425/174.8 E |
| 5,176,839 A * | 1/1993 | Kim | 249/78 |
| 5,182,060 A | 1/1993 | Berecz | |

(Continued)

FOREIGN PATENT DOCUMENTS

BE 834458 2/1976
DE 1504302 A1 4/1969

(Continued)

OTHER PUBLICATIONS

International Search Report PCT/US2010/025176, Aug. 31, 2010.*

(Continued)

*Primary Examiner* — Benjamin Schiffman
(74) *Attorney, Agent, or Firm* — Yee & Associates, P.C.

(57) ABSTRACT

A device changes the shape of a die used to compression mold a part. The device includes a sleeve placed between the die and a charge to be molded. The sleeve has an inner face generally conforming to a face of the die, and a outer face for molding a part.

18 Claims, 5 Drawing Sheets

(56) References Cited

U.S. PATENT DOCUMENTS

| | | | |
|---|---|---|---|
| 5,192,330 A * | 3/1993 | Chang et al. | 623/23.34 |
| 5,413,472 A * | 5/1995 | Dietterich et al. | 425/183 |
| 5,681,513 A | 10/1997 | Farley | |
| 5,716,487 A | 2/1998 | Sumerak | |
| 5,759,325 A | 6/1998 | Davis | |
| 5,820,804 A | 10/1998 | Elmaleh | |
| 5,958,550 A | 9/1999 | Childress | |
| 6,007,917 A | 12/1999 | Weigel et al. | |
| 6,024,555 A | 2/2000 | Goodridge et al. | |
| 6,162,314 A | 12/2000 | Kassuelke et al. | |
| 6,291,049 B1 | 9/2001 | Kunkel et al. | |
| 6,319,346 B1 | 11/2001 | Clark et al. | |
| 6,425,969 B1 | 7/2002 | van den Akker | |
| 6,689,448 B2 | 2/2004 | George et al. | |
| 6,696,009 B2 | 2/2004 | Davis | |
| 6,764,057 B2 | 7/2004 | Fanucci et al. | |
| 6,869,558 B2 | 3/2005 | Polk, Jr. et al. | |
| 7,186,361 B2 * | 3/2007 | Kasai et al. | 264/137 |
| 7,191,982 B2 * | 3/2007 | Vetillard et al. | 244/119 |
| 7,300,693 B2 | 11/2007 | Albers et al. | |
| 7,320,767 B2 * | 1/2008 | Edge et al. | 264/137 |
| 7,419,372 B2 * | 9/2008 | Kasai et al. | 425/89 |
| 7,431,875 B2 | 10/2008 | Rule | |
| 7,513,769 B2 | 4/2009 | Benson et al. | |
| 7,670,525 B2 * | 3/2010 | Weidmann et al. | 264/255 |
| 7,807,005 B2 | 10/2010 | Rubin et al. | |
| 7,871,553 B2 | 1/2011 | Wilkerson et al. | |
| 8,151,529 B2 * | 4/2012 | Weidmann et al. | 52/309.13 |
| 8,163,221 B2 * | 4/2012 | Suzuki et al. | 264/285 |
| 8,333,858 B2 * | 12/2012 | Rubin et al. | 156/212 |
| 2002/0088549 A1 * | 7/2002 | Fanucci et al. | 156/441 |
| 2002/0135093 A1 | 9/2002 | Davis | |
| 2003/0044570 A1 | 3/2003 | George et al. | |
| 2003/0168555 A1 * | 9/2003 | Livi et al. | 244/132 |
| 2003/0175520 A1 | 9/2003 | Grutta et al. | |
| 2003/0232176 A1 | 12/2003 | Polk, Jr. et al. | |
| 2004/0009338 A1 | 1/2004 | Jo et al. | |
| 2004/0096535 A1 * | 5/2004 | Hudecek et al. | 425/193 |
| 2005/0029707 A1 * | 2/2005 | Kasai et al. | 264/258 |
| 2005/0053765 A1 | 3/2005 | Albers et al. | |
| 2005/0056362 A1 | 3/2005 | Benson et al. | |
| 2005/0252603 A1 * | 11/2005 | Rule | 156/245 |
| 2006/0011289 A1 | 1/2006 | Suriano | |
| 2006/0083806 A1 * | 4/2006 | Kasai et al. | 425/391 |
| 2006/0216480 A1 * | 9/2006 | Weidmann et al. | 428/174 |
| 2006/0226288 A1 * | 10/2006 | Vetillard et al. | 244/119 |
| 2006/0249868 A1 * | 11/2006 | Brown et al. | 264/163 |
| 2007/0175571 A1 | 8/2007 | Rubin et al. | |
| 2007/0175572 A1 | 8/2007 | Rubin et al. | |
| 2007/0175573 A1 * | 8/2007 | Fox et al. | 156/196 |
| 2007/0175575 A1 | 8/2007 | Rubin et al. | |
| 2008/0168619 A1 | 7/2008 | Gonzalez et al. | |
| 2008/0185756 A1 * | 8/2008 | Wilkerson et al. | 264/297.4 |
| 2008/0185758 A1 | 8/2008 | Damme | |
| 2008/0277058 A1 | 11/2008 | Schmier et al. | |
| 2009/0065977 A1 * | 3/2009 | Suzuki et al. | 264/339 |
| 2009/0074905 A1 * | 3/2009 | Matsen et al. | 425/547 |
| 2009/0078362 A1 | 3/2009 | Wilkerson et al. | |
| 2010/0148005 A1 * | 6/2010 | Weidmann et al. | 244/119 |
| 2010/0319841 A1 | 12/2010 | Rubin et al. | |
| 2011/0206906 A1 | 8/2011 | Rubin et al. | |
| 2012/0175049 A1 * | 7/2012 | Suzuki et al. | 156/216 |

FOREIGN PATENT DOCUMENTS

| | | |
|---|---|---|
| DE | 1629830 A1 | 1/1971 |
| DE | 2165470 A1 | 7/1973 |
| DE | 2647821 A1 | 4/1978 |
| DE | 3709480 A1 | 10/1988 |
| DE | 4017978 A1 | 12/1991 |
| DE | 29711917 U1 | 8/1997 |
| EP | 0024895 A2 | 3/1981 |
| EP | 0277727 A1 | 8/1988 |
| EP | 0317861 A2 | 5/1989 |
| EP | 1336469 A1 | 8/2003 |
| EP | 1504880 A1 | 2/2005 |
| EP | 1614624 A1 | 1/2006 |
| EP | 1666353 A1 | 6/2006 |
| EP | 1813404 A2 * | 8/2007 |
| EP | 1995040 A1 | 11/2008 |
| EP | 2014448 A2 * | 1/2009 |
| FR | 2587649 A1 | 3/1987 |
| FR | 2888155 A1 | 1/2007 |
| GB | 531357 | 1/1941 |
| GB | 1157239 | 7/1969 |
| WO | 8302085 A1 | 6/1983 |
| WO | 8810186 A1 | 12/1988 |
| WO | 2007092371 A2 | 8/2007 |
| WO | 2008073164 A2 | 6/2008 |
| WO | 2008094227 A1 | 8/2008 |
| WO | 2008097847 A1 | 8/2008 |
| WO | WO 2010101744 A2 * | 9/2010 |
| WO | 2011106117 A1 | 9/2011 |

OTHER PUBLICATIONS

Rubin et al., "Method for Fabricating Thermoplastic Composite Parts," USPTO U.S. Appl. No. 13/673,989 and Preliminary Amendment, filed Nov. 9, 2012, 52 pages.

European Patent Office Communication, dated Aug. 9, 2011, regarding Application No. EP08728832.0, 5 pages.

Final Office Action. dated Sep. 19, 2012, regarding U.S. Appl. No. 11/697,378, 10 pages.

Final Office Action, dated Apr. 16, 2012, regarding USPTO U.S. Appl. No. 11/584,923, 9 pages.

USPTO Office Action dated Jun. 18, 2012 regarding U.S. Appl. No. 11/697,378, 20 pages.

USPTO Final Office Action dated Jun. 15, 2012 regarding U.S. Appl. No. 12/711,401, 33 pages.

USPTO Office Action dated Jul. 5, 2012 regarding U.S. Appl. No. 11/701,789, 30 pages.

USPTO Notice of Allowance dated Jul. 25, 2012 regarding U.S. Appl. No. 11/584,923, 19 pages.

International Search Report dated Oct. 23, 2007, regarding Application No. PCT/US2007/003021, 3 pages.

International Search Report dated Oct. 27, 2008, regarding Application No. PCT/US2007/018611, 3 pages.

International Search Report dated Mar. 31, 2008, regarding Application No. PCT/US2007/022234, 3 pages.

International Search Report dated Jul. 17, 2008, regarding Application No. PCT/US2008/052806, 2 pages.

International Search Report dated Apr. 28, 2011, regarding Application No. PCT/US2011/022003, 3 pages.

Loos et al., "Thermoplastic Composite Sheet Forming," presented at National Science Foundation Workshop on Composite Sheet Forming, Sep. 5-7, 2001, Lowell, MA. Accessed Apr. 4, 2012, http://www.mech.northwestern.edu/fac/cao/nsfworkshop/presentations/ns7_loos.pdf, 11 pages.

Prebil et al., USPTO U.S. Appl. No. 13/419,187, filed Mar. 13, 2012, 67 pages.

Preliminary Amendment, dated Aug. 1, 2008, regarding U.S. Appl. No. 11/347,122, 39 pages.

USPTO Office Action, dated Mar. 12, 2009, regarding U.S. Appl. No. 11/347,122, 16 pages.

USPTO Final Office Action, dated Jul. 9, 2009, regarding U.S. Appl. No. 11/347,122, 8 pages.

USPTO Office Action, dated Nov. 23, 2009, regarding U.S. Appl. No. 11/347,122, 9 pages.

USPTO Final Office Action, dated Jun. 24, 2010, regarding U.S. Appl. No. 11/347,122, 12 pages.

USPTO Notice of Allowance, dated Jul. 21, 2010, regarding U.S. Appl. No. 11/347,122, 6 pages.

USPTO Office Action, dated Feb. 4, 2010, regarding U.S. Appl. No. 11/584,923, 16 pages.

USPTO Final Office Action, dated Jul. 13, 2010, regarding U.S. Appl. No. 11/584,923, 12 pages.

USPTO Office Action, dated Jul. 27, 2011, regarding U.S. Appl. No. 11/584,923, 10 pages.

(56) References Cited

OTHER PUBLICATIONS

USPTO Office Action, dated Apr. 15, 2010, regarding U.S. Appl. No. 11/697,378, 28 pages.
USPTO Final Office Action, dated Oct. 27, 2010, regarding U.S. Appl. No. 11/697,378, 20 pages.
USPTO Office Action, dated Jul. 27, 2011, regarding U.S. Appl. No. 11/697,378, 19 pages.
USPTO Final Office Action, dated Mar. 2, 2012, regarding U.S. Appl. No. 11/697,378, 6 pages.
USPTO Office Action, dated Feb. 2, 2010, regarding U.S. Appl. No. 11/699,653, 15 pages.
USPTO Final Office Action, dated Jul. 16, 2010, regarding U.S. Appl. No. 11/699,653, 10 pages.
USPTO Office Action, dated Feb. 16, 2011, regarding U.S. Appl. No. 11/699,653, 12 pages.
USPTO Final Office Action, dated Jul. 7, 2011, regarding U.S. Appl. No. 11/699,653, 14 pages.
USPTO Office Action, dated Oct. 1, 2009, regarding U.S. Appl. No. 11/701,789, 17 pages.
USPTO Final Office Action, dated Mar. 25, 2010, regarding U.S. Appl. No. 11/701,789, 15 pages.
USPTO Office Action, dated Jun. 21, 2010, regarding U.S. Appl. No. 11/701,789, 11 pages.
USPTO Final Office Action, dated Dec. 29, 2010, regarding U.S. Appl. No. 11/701,789, 14 pages.
USPTO Office Action, dated Apr. 20, 2011, regarding U.S. Appl. No. 11/701,789, 15 pages.
USPTO Final Office Action, dated Oct. 12, 2011, regarding U.S. Appl. No. 11/701,789, 17 pages.
USPTO Office Action, dated Sep. 11, 2009, regarding U.S. Appl. No. 11/859,057, 10 pages.
USPTO Final Office Action, dated Mar. 23, 2010, regarding U.S. Appl. No. 11/859,057, 10 pages.
USPTO Notice of Allowance, dated Oct. 4, 2010, regarding U.S. Appl. No. 11/859,057, 9 pages.
USPTO Office Action, dated Dec. 16, 2011, regarding U.S. Appl. No. 12/711,401, 21 pages.
Cai et al., "Consolidation Techniques and Cure Control," In: Handbook of Composites, Second Edition, Peters (Ed.), Chapman & Flail, London, 1998, pp. 576-577.
Final Office Action, dated Dec. 13, 2012, regarding USPTO U.S. Appl. No. 11/701,789, 9 pages.
Office Action, dated Jan. 18, 2013 regarding USPTO U.S. Appl. No. 12/711,401, 32 pages.

\* cited by examiner

METHOD OF MOLDING PARTUS USING A TOOL SLEEVE FOR MOLD DIE

TECHNICAL FIELD

This disclosure generally relates to molding techniques and tools, especially compression molding, and deals more particularly with a sleeve used with a single mold die to mold parts with differing shapes.

BACKGROUND

Heated dies may be used to compression mold complex, high strength fiber reinforced thermoplastic parts. A thermoplastic charge is placed between the dies and compressed using high pressure to form the parts. At least one of the dies may include tooling features that are imparted to the part during the molding process.

There is sometimes a need to mold small quantities of parts for prototyping or other purposes. In some cases, the parts may have only minor differences in shape and/or dimensions, but these differences may require that separate dies be individually fabricated for each unique part. Since the dies are normally fabricated from steel or aluminum, the tooling effort required to make separate dies for each unique part can be costly and time consuming.

Accordingly, there is a need for a device and related method for compression molding parts having similar features using a single die having a fixed size and shape. There is also a need for a method of compression molding a family of parts using a single die which minimizes lead times for adapting molding equipment to produce different parts.

SUMMARY

The disclosed embodiments provide a device and related method for compression molding a variety or family of parts having variable geometries, using a single die having a fixed size and shape, and a single or a series of tool sleeves in conjunction with the die. The molded parts may have either constant or stepped thicknesses along their lengths by incorporating steps in the tool sleeves.

According to one embodiment, a device is provided for changing the shape of a die used to compression mold a part. The device includes a sleeve disposable over the die. The sleeve has an inner face generally conforming to the face of the die and includes a contoured outer face for molding a part. The sleeve may include sides forming a cavity for receiving the die therein. The device may further include at least one shim for filling a gap between the sleeve and the die in order to accommodate manufacturing tolerances or thermal expansion of the die.

According to another embodiment, a device is provided for changing the shape of a part that may be molded by a compression mold die having a fixed shape. The device includes a tool sleeve that may be installed between the die and a mold charge. The tool sleeve includes an inner face substantially conforming to a face on the die.

According to a disclosed method embodiment, parts having any of a plurality of shapes may be compression molded using a molding die. The method includes producing a plurality of sleeves respectively having shapes related to the shapes of the parts. The method further includes selecting one of the sleeves and installing the selected sleeve between the die and a mold charge. A part is compression molded using the die and the selected sleeve.

According to still another method embodiment, a method is provided for changing the shape of elongate thermoplastic parts molded by a single compression molding die having a fixed cross section. The method includes producing a tool sleeve, including providing an inner face of the sleeve with a shape that substantially matches the cross sectional shape of the die. The outer face of the tool sleeve is provided with a feature different than features of the die, wherein the feature include at least one of a wall thickness, a radius and a ramp. The sleeve is installed over the die such that the outer face acts as a molding surface for compression molding a part. At least one shim is placed between the sleeve and the die.

The disclosed embodiments satisfy the need for a device and method of molding any of a plurality of differently shaped parts using a single die.

BRIEF DESCRIPTION OF THE ILLUSTRATIONS

DETAILED DESCRIPTION

Figure 1:
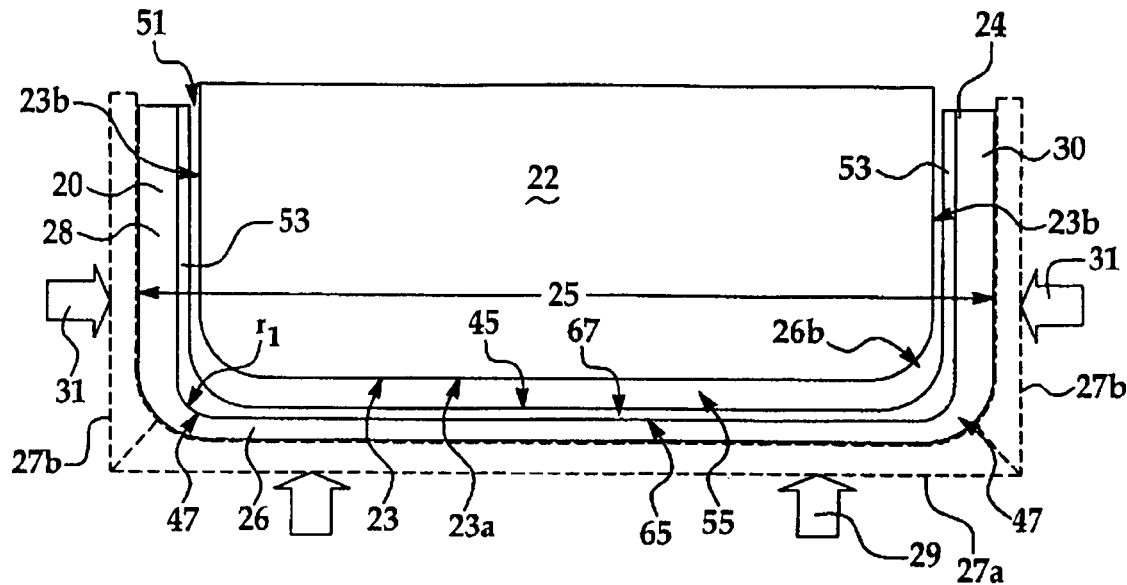
FIG. 1 is an illustration of a cross section of a part being molded by a compression die having a tool sleeve installed thereon according to the disclosed embodiments.
Figure 2:
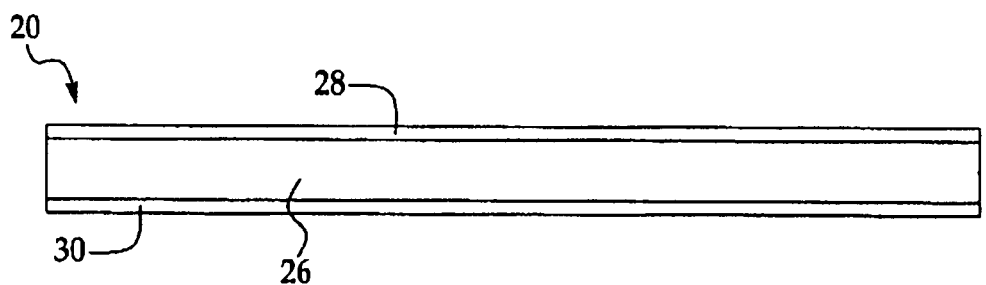
FIG. 2 is an illustration of a plan view of the part molded by the die and tool sleeve shown in FIG. 1.

Referring first to FIGS. 1 and 2, a die 22 includes a fixed die face 23 used to compression mold a part 20 which may be for example and without limitation, a fiber reinforced thermoplastic. The part 20 may be molded from a charge (not shown) and may comprise any of a variety of thermoplastic resins. The resins may include, but are not limited to PEKK, PPS, and PEI, reinforced with any of a variety of fibers, including but not limited to carbon, fiberglass and other fibers. The fixed die face 23 includes a bottom face 23a and side faces 23b. As used herein, a "fixed die face" and "fixed shape die" refer to the fact that the shape and dimensions of the die 22, including those of the die face 23, are fixed, or constant, due to the fact that the die 22 is formed from hard materials such as, without limitation, tool steel, aluminum, ceramic or composites. Thus, features of the die may not be readily altered except by machining or similar processes.

In the illustrated example, the part 20 is an elongate structural member having a substantially C-shaped cross section defined by a web 26 connecting a pair of flanges 28, 30. The die 22 compresses the charge (not shown) against a lower die 27a which applies a reaction force indicated by the arrows 29 against the bottom face 23a of the die 22. Additionally, dies 27b may apply reaction forces in the direction of the arrows 31 against the side faces 23b of the die 22 in order to form the flanges 28, 30.

Although not shown in the drawings, the die 22 illustrated in FIG. 1 may be used in any of a variety of compression molding machines, including continuous compression molding machines as described in the following U.S. patent applications, the disclosures of all of which applications are incorporated by reference herein: Ser. No. 11/347,122 filed Feb. 2, 2000; Ser. No. 11/584,923 filed Oct. 20, 2006; Ser. No. 11/701,789 filed Feb. 3, 2007; and, Ser. No. 11/699,653 filed Jan. 29, 2007.

Figure 2A:
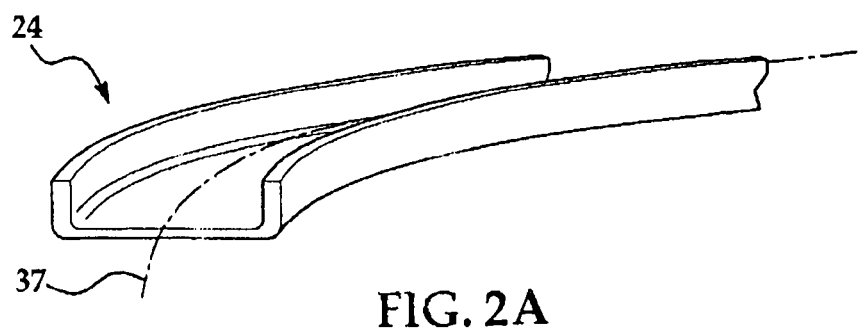
FIG. 2A is an illustration of a perspective view of a tool sleeve that is curved along its longitudinal axis.

In accordance with the disclosed embodiment, a tool sleeve 24 may be installed on the die 22 to alter the shape of a part molded by the die 22. As used herein, "shape" is intended to include the size and/or dimensions and/or geometry of a part 20, such as the length, width, thickness and/or contour of the part 20. In effect, the tool sleeve 24 changes the shape of the fixed die face 23 so that the same die 22 may be used to mold parts having shapes that are different from that which could be molded by the die 22 itself. The tool sleeve 24 may comprise, without limitation, steel, a synthetic polymer such as a thermoplastic, ceramic or a composite, and may be fabricated by any suitable forming or molding techniques that are rapid and low cost. In this example, the tool sleeve 24 has a constant thickness bottom 45 and constant thickness sides 53 forming a cavity 55 for receiving the die 22 therein. However, as will be discussed below, the tool sleeve 24 may have a varying thickness either along its length or its width. The bottom 45 of the sleeve 24 includes a first, inner face 65 and a second, outer face 67. When the tool sleeve 24 is installed on the die 22, the bottom face 23a of the die 22 engages the inner face 65 of the tool sleeve 24, and the sides 53 the tool sleeve 24 engage the side faces 23b of the die 22. It should be noted here that where the die 22 is curved (not shown), the tool sleeve 24 may be similarly curved along its longitudinal axis 37, as shown in FIG. 2A. Also, it should be noted that while the tool sleeve 24 is shown installed between the die 22 and the charge (not shown) that is molded into the part 20, the sleeve 24 may be installed between the charge and the dies 27A and 27B. In some embodiments, sleeves 24 may be installed both between the charge and the die 22, and between the charge and the dies 27A and/or 27B.

The sleeve 24 is removably installed on the die 22. Thus, several different sleeves 24 may be used with a single die 22 to mold differently shaped parts. In the illustrated example, the sides 53 of the sleeve 24 may be sleeved over the die 22 during installation of the sleeve 24. In other embodiments, the sleeve 24 may not include sides 53 and other means (not shown) may be used to hold the sleeve 24 on the face 23 of the die 22.

A gap 51 may be present between the die 22 and the tool sleeve 24 in order to accommodate machining tolerance build-up and/or thermal expansion. As will be discussed later, a shim (not shown) formed of brass, steel or other materials may be placed in the gap 51 to provide a tight fit between the die 22 and the tool sleeve 24.

Although the tool sleeve 24 illustrated in FIGS. 1 and 2 has a C-shaped cross section as, the tool sleeve 24 and related method may be employed to produce parts having a variety of other cross sectional shapes possessing varying dimensions and features, including, but not limited to T, I and J shapes.

As will be discussed below, the bottom 45 and sides 53 of the tool sleeve 24 may have a constant thickness or variable thickness along its length to mold parts of various dimensions and/or shapes while using the same die 22, the shape and dimensions of which are fixed. In other words, the die 22 has a fixed cross sectional shape. The contour of the outer face 67 of the tool sleeve 24 that engages the charge (not shown) is constant, for constant thickness parts, or may be variable for parts that have joggles or stepped or varying thicknesses along their length. The contour of the inner face 65 of the tool sleeve 24 that contacts the die 22 is constant, and matches or conforms to the constant contour of the tool face 23. It is possible for the die face 23 to have a contour that is not constant, in which case the inner face 65 of the tool sleeve will be formed to have a contour that conforms to the contour of the die face 23.

The tool sleeve 24 may include features such as outside radiused corners 47 having radii $r_1$ which may different from the corresponding radii on the corners 26b of the die 22. In the illustrated example, because of the presence of the side walls 53 on the tool sleeve 24, the overall width 25 of the part 28 is greater than the width of the part that would be molded using the die 22 without the tool sleeve 24. Also, although the outer face 67 of the tool sleeve 24 is shown as being flat across its width (cross section), the outer face 67 may be curved across its width or have other contours. Similarly, the outer face 67 of the sides 53 of the sleeve 24 may also be curved over their heights or along their lengths, or have other contours.

Figure 3A:
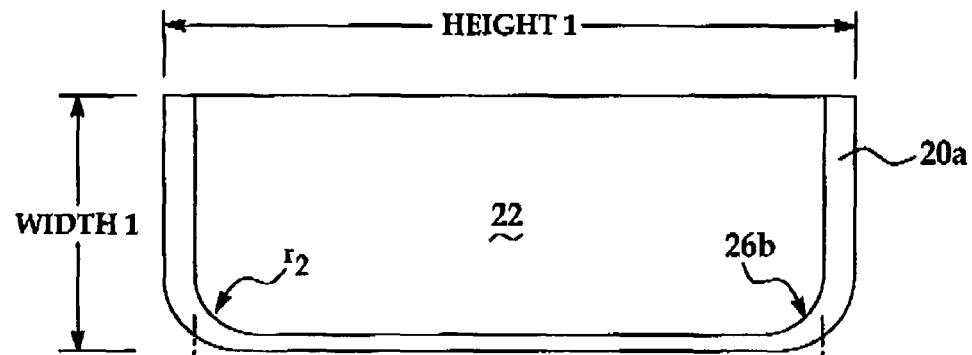
FIG. 3A is an illustration of a cross section of the die shown in FIG. 1, having molded a part without the use of the tool sleeve.

FIG. 3A illustrates a part 20a comprising a C-shaped channel that is molded with the die 22, without the use of the tool sleeve 24. The molded C-shaped channel 20a has a Height 1, and a Width 1.

Figure 3B:
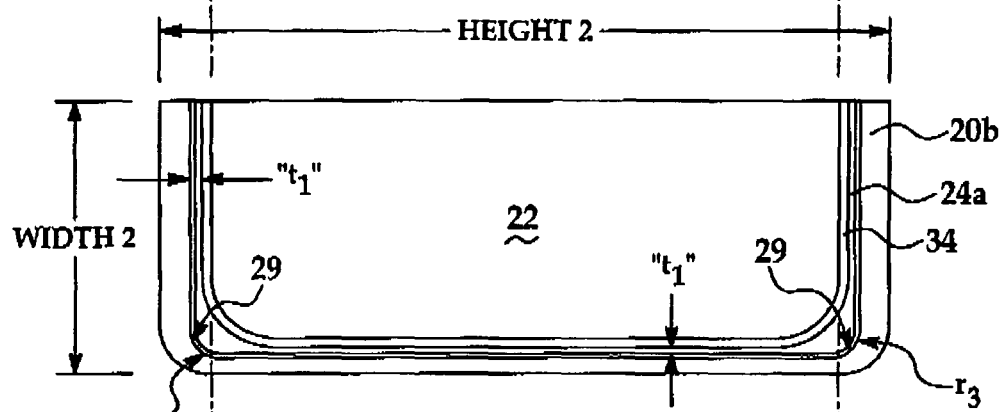
FIG. 3B is an illustration similar FIG. 3A but wherein a tool sleeve has been installed on the die for molding a variation of the part shown in FIG. 3A.

FIG. 3B illustrates the die 22 shown in FIG. 3A fitted with a first sleeve 24a using a shim 34 of suitable thickness to create a substantially tight fit between the sleeve 24a and the die 22. As of a result of the thickness $t_1$ added by the sleeve 24a, the Height 2 and Width 2 of a molded C-shaped channel 20b are respectively greater than the Height 1 and Width 1 of channel 20a shown in FIG. 3A. In addition, the sleeve 24a includes an outside corner radius 29 that is dimensioned to mold an inside radius $r_3$ in the channel 20b which is tighter (less) than radius $r_2$ of channel 20a shown in FIG. 3A.

Figure 3C:
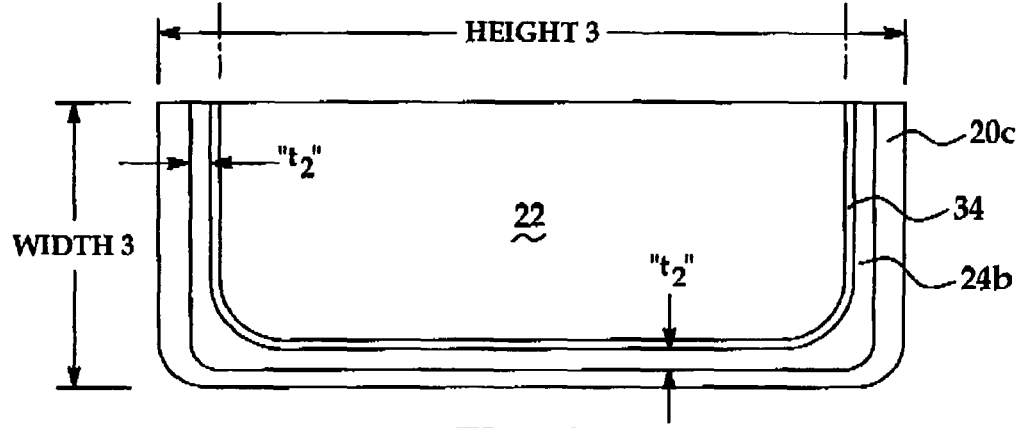
FIG. 3C is an illustration similar to FIG. 3B but showing another tool sleeve having been installed on the die for molding a second variation of the part shown in FIG. 3A.

FIG. 3C illustrates another C-shaped channel 20c that is molded using a sleeve 24b fitted over the die 22 using a shim 34. In this example, the wall thickness $t_2$ of the sleeve 24b is greater than the wall thickness $t_1$ of the sleeve 24a shown in FIG. 3B. As a result of this increased wall thickness $t_2$, the molded C-shaped channel 20c has a Height 3 and Width 3 which are respectively greater than the Height 2 and Width 2 of the channel 20b shown in FIG. 3B.

From FIGS. 3A-3C, it is apparent that various dimensions and features of a part such as the channel 20 can be varied using differently shaped and/or dimensioned sleeves 24a fitted onto a single die 22 having a fixed shape and dimensions.

Figure 4:
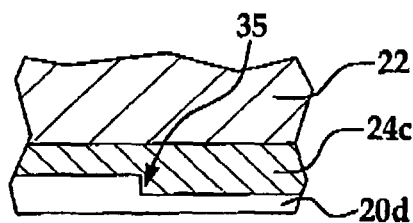
FIG. 4 is an illustration of a sectional view of a tool sleeve on a die used to mold a part having a step feature.
Figure 5:
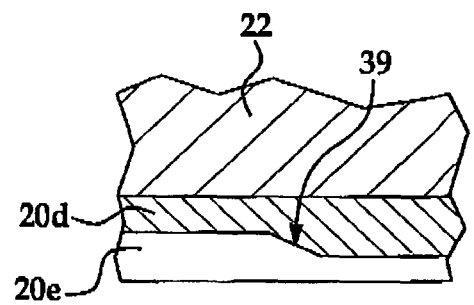
FIG. 5 is an illustration of a sectional view of another tool sleeve on the die shown in FIG. 4, used to mold a part having a ramp feature.
Figure 6:
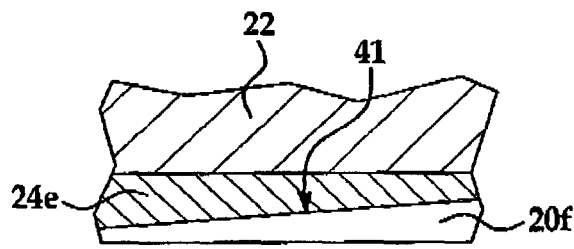
FIG. 6 is an illustration of a further tool sleeve on the die shown in FIG. 4, used to mold a part having a gradually tapering thickness.

As previously mentioned, the sleeve 24 may be used with a single die 22 of fixed shape and dimensions to produce any of a variety of features in a part, in addition to altering the dimensions of the part as previously discussed in connection with FIGS. 3A-3C. For example, referring to FIG. 4, a sleeve 24c fitted over a die 22 may be employed to mold a step feature 35 into a part 20d along at least a portion of its length. Similarly, as shown in FIG. 5, a sleeve 24d fitted over the die 22 is employed to mold a joggle or ramp feature 39 into a part 20e along at least a portion of its length. FIG. 6 illustrates a sleeve 24e fitted over the die 22 to mold a linearly changing thickness 41 along at least a portion of the length of a part 20f.

Figure 7:
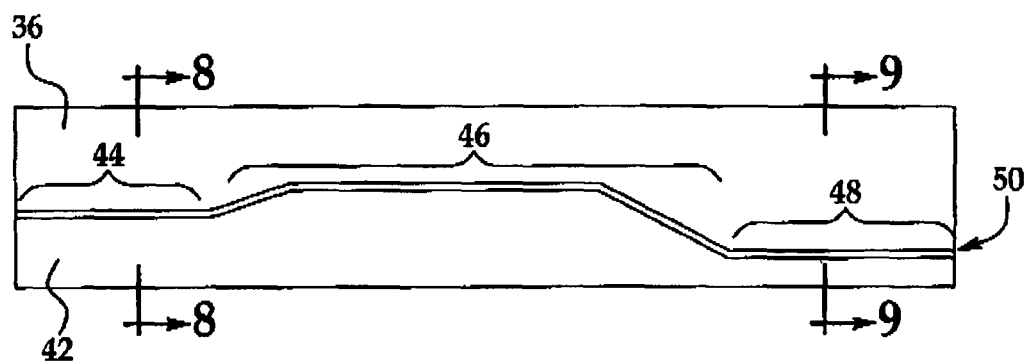
FIG. 7 is a an illustration of a longitudinal side view of a pair of dies using a tool sleeve to compression mold a part according to another embodiment.
Figure 8:
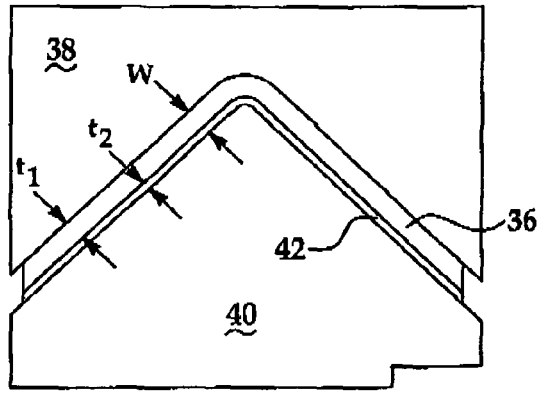
FIG. 8 is an illustration of a sectional view taken along the line 8-8 in FIG. 7.
Figure 9:
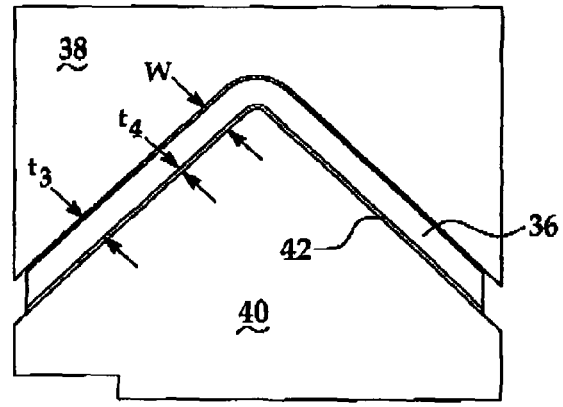
FIG. 9 is an illustration of a sectional view taken along the line 9-9 in FIG. 7.

Attention is now directed to FIGS. 7-9 which illustrate another embodiment of a tool sleeve 42 that may be used in conjunction with a single set of dies 38, 40 to mold a thermoplastic composite part 36 having an L-shaped cross section. The sleeve 42 may be formed as by molding a suitable material such as thermoplastic, and may be used in conjunction with a single set of dies 38, 40 to mold a thermoplastic composite part. An L-shaped cross section is illustrated in FIGS. 8 and 9. However, a variety of other cross sectional shapes may be molded using the sleeve 42, including but not limited to I, C, T and J shapes. The part 36 molded by the sleeve 42 may have a constant or stepped thickness along its length "L" (FIG. 7) that is different than the single constant thickness cross section part that could be molded using the dies 38, 40 without the use of the sleeve 42.

In the illustrated example, the part 36 includes a section 44 of reduced thickness $t_1$ (FIG. 8) and a double stepped section 46 along its length. Sleeve 42 has an increased thickness $t_2$ along section 44 so as to at least substantially fill the space W between the dies 38, 40. As shown in FIG. 9, the part 36 has a greater thickness $t_3$ along section 48, and accordingly the sleeve 42 has corresponding reduced thickness $t_4$ along section 48. Thus, it can be appreciated from FIGS. 7-9 that the sleeve 42 is designed to fill the space between the dies 38, 40 and the part 36. A release layer 50 may be placed between the part 36 and the sleeve 42 to facilitates ease of separation of the part 36 from the sleeve 42. The release layer 50 may be formed of any of various materials such as, for example and without limitation, Kapton® film or a metal foil.

Figure 10:
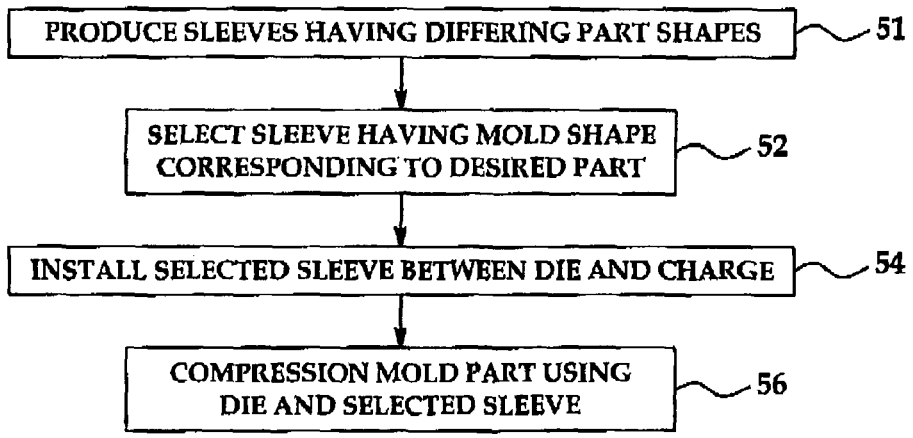
FIG. 10 is an illustration of a method of molding parts using the tool sleeve.

FIG. 10 broadly illustrates the steps of a method of compression molding parts using tool sleeves 24, 42 of the type previously described in conjunction with a die having a substantially constant shape and fixed dimensions. Starting at 51, one or more sleeves 24, 42 are produced in which one face 67 of the sleeve 24, 42 substantially matches the size and shape of a die 22. The other face 65 of the sleeve 24, 42 fills the space between the die 22 and a part 20 to be molded. Next, at 52, a sleeve 24, 42 having the desired shape is selected which corresponds to the desired part 20. At 54, the selected sleeve 24, 42 is installed, either by fitting the sleeve 24, 42 over one of the dies 22, or by placing the sleeve 24, 42 between dies 38, 40 in a die set. At step 56, a charge is placed between the installed sleeve 24, 42 and the die 22, and the charge is then compression molded into the part 20. Following molding of the part 36, the sleeve 24, 42 may be used to mold additional parts using the dies 22.

Figure 11:
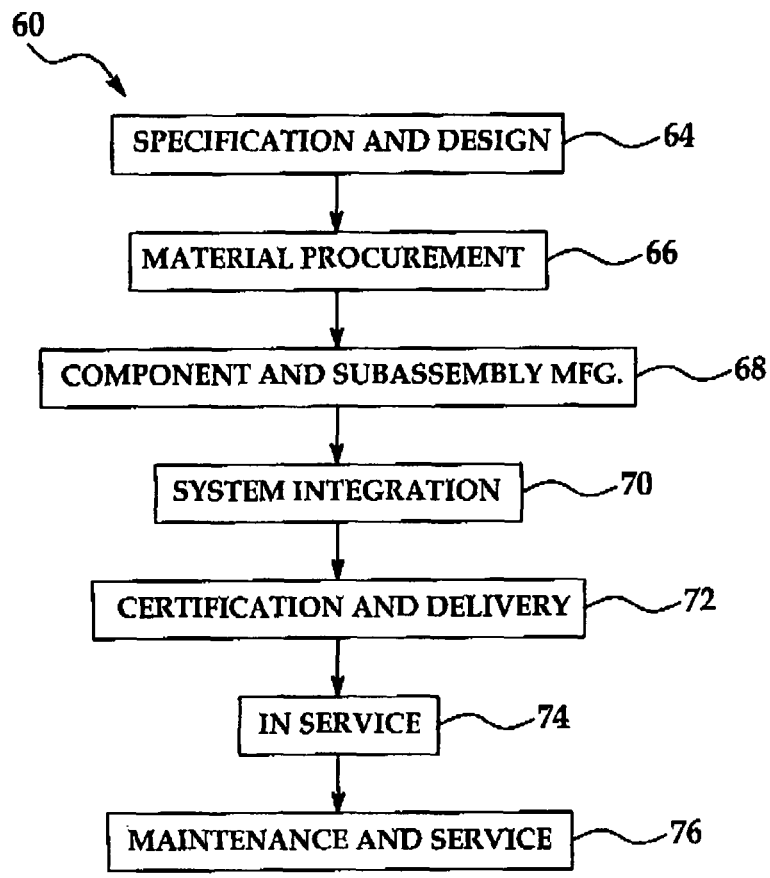
FIG. 11 is an illustration of a flow diagram of aircraft production and service methodology.
Figure 12:
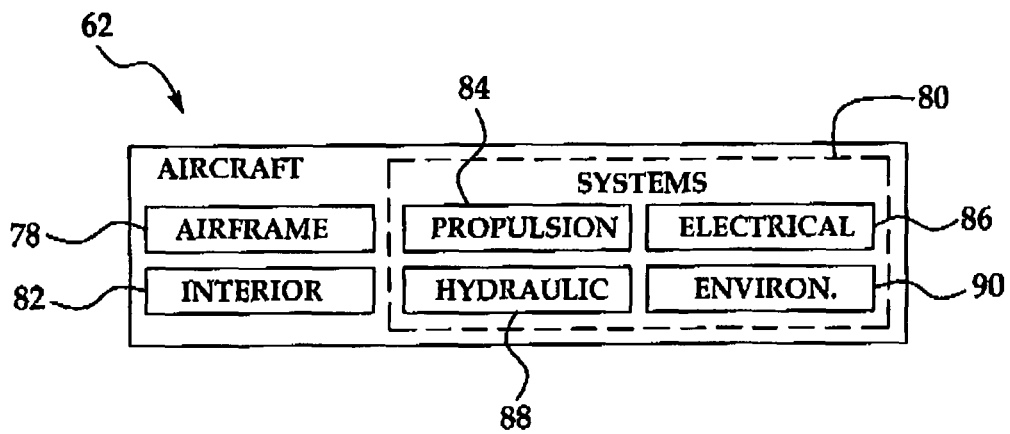
FIG. 12 is an illustration of a block diagram of an aircraft.

Embodiments of the disclosure may find use in a variety of potential applications, particularly in the transportation industry, including for example, aerospace, marine and automotive applications. Thus, referring now to FIGS. 11 and 12, embodiments of the disclosure may be used in the context of an aircraft manufacturing and service method 60 as shown in FIG. 11 and an aircraft 62 as shown in FIG. 12. Aircraft applications of the disclosed embodiments may include, for example, without limitation, composite stiffened members such as fuselage skins, wing skins, control surfaces, hatches, floor panels, door panels, access panels and empennages, to name a few. During pre-production, exemplary method 60 may include specification and design 64 of the aircraft 62 and material procurement 66, in which the disclosed method may be specified for use in fabricating components. During production, component and subassembly manufacturing 68 and system integration 70 of the aircraft 62 takes place. The disclosed device and method may be used to fabricate components that are then assembled and integrated with other subassemblies. Thereafter, the aircraft 62 may go through certification and delivery 72 in order to be placed in service 74. While in service by a customer, the aircraft 62 is scheduled for routine maintenance and service 76 (which may also include modification, reconfiguration, refurbishment, and so on). The components fabricated by the disclosed method and device may be used to replace components on the aircraft 62 during the maintenance and service 76.

Each of the processes of method 60 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 12, the aircraft 62 produced by exemplary method 60 may include an airframe 78 with a plurality of systems 80 and an interior 82. Examples of high-level systems 80 include one or more of a propulsion system 84, an electrical system 86, a hydraulic system 88, and an environmental system 90. Any number of other systems may be included. Although an aerospace example is shown, the principles of the disclosure may be applied to other industries, such as the marine and automotive industries.

Systems and methods embodied herein may be employed during any one or more of the stages of the production and service method 60. For example, components or subassemblies corresponding to production process 68 may be fabricated or manufactured in a manner similar to components or subassemblies produced while the aircraft 62 is in service. Also, one or more apparatus embodiments, method embodiments, or a combination thereof may be utilized during the production stages 68 and 70, for example, by substantially expediting assembly of or reducing the cost of an aircraft 62. Similarly, one or more of apparatus embodiments, method embodiments, or a combination thereof may be utilized while the aircraft 62 is in service, for example and without limitation, to maintenance and service 76.

Although the embodiments of this disclosure have been described with respect to certain exemplary embodiments, it is to be understood that the specific embodiments are for purposes of illustration and not limitation, as other variations will occur to those of skill in the art.

What is claimed:

1. A method of producing composite parts using a continuous compression molding machine, the method comprising:
   producing a plurality of tool sleeves, each tool sleeve having a respective shape related to a shape of a composite part, each tool sleeve in the plurality of tool sleeves having a different shape than every other tool sleeve in the plurality of tool sleeves, each tool sleeve in the plurality of tool sleeves having an inner face having a shape that substantially matches a cross sectional shape of a die of the continuous compression molding machine;
   selecting a first tool sleeve of the plurality of tool sleeves;
   installing the selected first tool sleeve of the plurality of tool sleeves over and contacting the die of the continuous compression molding machine to fully cover the face of the die;

compression molding a first composite charge into a first composite part using the continuous compression molding machine, the installed first tool sleeve contacting the first composite charge during compression molding;

removing the installed first tool sleeve from the die;

selecting a second tool sleeve of the plurality of tool sleeves;

installing the selected second tool sleeve over and contacting the die of the continuous compression molding machine to fully cover the face of the die; and compression molding a second composite charge into a second composite part using the continuous compression molding machine, the installed second tool sleeve contacting the second composite charge during compression molding.

2. The method of claim 1, wherein installing the selected first tool sleeve includes receiving the die into a cavity formed by the selected first tool sleeve.

3. The method of claim 1, wherein producing the plurality of tool sleeves includes forming an inside face on each of the sleeves that substantially matches the shape of a face on the die.

4. The method of claim 1, wherein
the second composite part has a different cross-section than the first composite part.

5. The method of claim 1, wherein the continuous compression molding machine is configured to produce a third composite part using the die without a tool sleeve.

6. The method of claim 5, wherein a height and a width of the third composite part are different than a height and a width of the first composite part.

7. The method of claim 1, wherein a thickness of a first portion of the selected first tool sleeve affects a height of the first composite part and wherein a thickness of a second portion of the selected first tool affects a width of the first composite part.

8. A method comprising:
producing a tool sleeve, producing the tool sleeve comprising providing the sleeve with a cavity substantially matching a cross sectional shape of a die of a continuous compression molding tool and providing the tool sleeve with a shape related to a shape of a part to be produced;

installing the tool sleeve over the die of the continuous compression molding machine to fully cover a face of the die, the tool sleeve having a cross-sectional area with varying thickness;

placing at least one shim between an inner face of the tool sleeve and the die; and compression molding a composite charge into a part using the continuous compression molding machine, such that an outer face of the installed tool sleeve contacts the composite charge.

9. The method of claim 8, wherein installing the tool sleeve includes placing the tool sleeve over sides of the die.

10. The method of claim 8, wherein the composite part is a first composite part, and wherein the continuous compression molding machine is configured to produce a second composite part using the die without a tool sleeve.

11. The method of claim 8, wherein installing the tool sleeve on the die changes a shape of composite parts molded by the continuous compression molding machine.

12. A method of changing a shape of elongate thermoplastic composite parts molded by a continuous compression molding machine, comprising:
producing a tool sleeve, producing the tool sleeve comprising:
providing an inner face of the tool sleeve with a shape that substantially matches a cross sectional shape of a die of the continuous compression molding machine, the die having a fixed cross section; and providing an outer face of the tool sleeve with a feature different than features of the die, wherein the feature includes at least one of a wall thickness, a radius and a ramp;

installing the tool sleeve over and contacting the die to fully cover a face of the die such that the outer face of the tool sleeve acts as a molding surface for compression molding a composite charge, the sleeve having a cross-sectional area with varying thickness;

placing at least one shim between the inner face of the installed tool sleeve and the face of the die; and compression molding a composite charge using the continuous compression molding machine to form a composite part, the outer face of the installed tool sleeve contacting the composite charge.

13. A method of producing a part, the method comprising:
producing a sleeve, the sleeve made of a thermoplastic material;

placing a release layer between the sleeve and a composite charge; and compression molding the composite charge using a single set of dies in conjunction with the sleeve in a continuous compression molding machine to form a first composite part, wherein the continuous compression molding machine is configured to produce a second composite part without the sleeve, and wherein a dimension of the second composite part is different than a dimension of the first composite part.

14. The method of claim 13, further comprising:
placing the sleeve between dies of the single set of dies.

15. The method of claim 13, wherein a distance between the single set of dies is constant when the single set of dies is closed during a compression molding of the composite charge.

16. The method of claim 13, wherein the sleeve is designed to fill a space between the single set of dies and the first composite part.

17. The method of claim 13, wherein producing the sleeve comprises producing the sleeve so that the sleeve has a varying thickness when the first composite part has a varying thickness.

18. The method of claim 13 further comprising:
separating the first composite part from the sleeve.

* * * * *

UNITED STATES PATENT AND TRADEMARK OFFICE
CERTIFICATE OF CORRECTION

| | | |
|---|---|---|
| PATENT NO. | : 8,691,137 B2 | Page 1 of 1 |
| APPLICATION NO. | : 12/398071 | |
| DATED | : April 8, 2014 | |
| INVENTOR(S) | : Charles R. Prebil et al. | |

It is certified that error appears in the above-identified patent and that said Letters Patent is hereby corrected as shown below:

On the title page Item (54) and in the specification, in Column 1, Line 1-2 should read:
METHOD OF MOLDING PARTS USING A TOOL SLEEVE FOR MOLD DIE Signed and Sealed this
Seventeenth Day of June, 2014

Michelle K. Lee
*Deputy Director of the United States Patent and Trademark Office*